United States Patent [19]

Rodriguez

[11] 4,176,674

[45] Dec. 4, 1979

[54] FAUCET REPLACEMENT VALVE STEM ASSEMBLY

[76] Inventor: Manuel F. Rodriguez, 4234 Avery Ave., Detroit, Mich. 48208

[21] Appl. No.: 934,027

[22] Filed: Aug. 16, 1978

[51] Int. Cl.² .................................................. F16K 43/00
[52] U.S. Cl. .................... 137/315; 251/216; 251/221; 251/222; 251/225; 251/264; 251/318; 251/273
[58] Field of Search .............. 137/315; 251/216, 221, 251/222, 225, 273, 264, 318

[56] References Cited

U.S. PATENT DOCUMENTS

| | | | |
|---|---|---|---|
| 112,173 | 2/1871 | Sullivan | 251/221 |
| 686,854 | 11/1901 | Huxley | 251/222 |
| 728,699 | 5/1903 | Gallagher | 137/315 |
| 849,989 | 4/1907 | Ferguson | 251/225 |
| 1,617,599 | 2/1927 | Kingston | 251/225 |
| 1,677,794 | 7/1928 | Mueller et al. | 251/221 |
| 2,059,991 | 11/1936 | Goehring | 251/318 |
| 2,629,580 | 2/1953 | Schultis et al. | 251/221 |
| 3,052,257 | 9/1962 | Bartlett | 251/222 |
| 3,114,385 | 12/1963 | Kimbro | 137/315 |

*Primary Examiner*—Martin P. Schwadron
*Assistant Examiner*—G. L. Walton
*Attorney, Agent, or Firm*—Barnes, Kisselle, Raisch & Choate

[57] ABSTRACT

A replacement valve stem assembly for a faucet in the form of an internally and externally threaded sleeve extending through and secured by nuts to the faucet cap and a threaded valve stem engaging the internal threads of the sleeve and having a valve washer secured to the inner end thereof and a faucet handle secured to the outer end thereof.

11 Claims, 4 Drawing Figures

U.S. Patent
Dec. 4, 1979
4,176,674
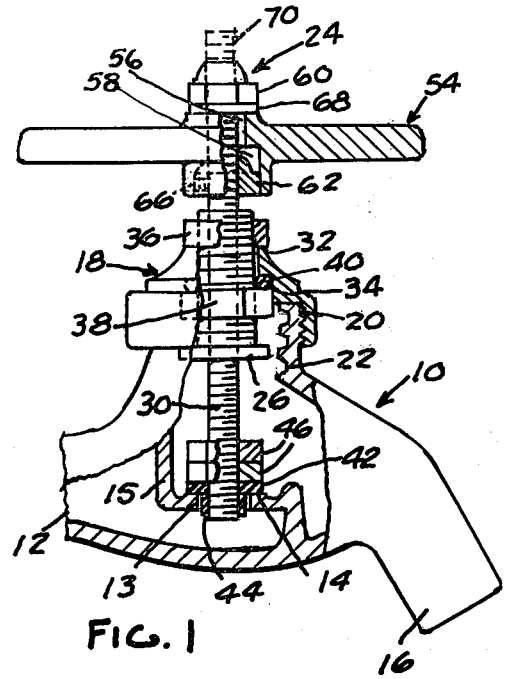
FIG. 1
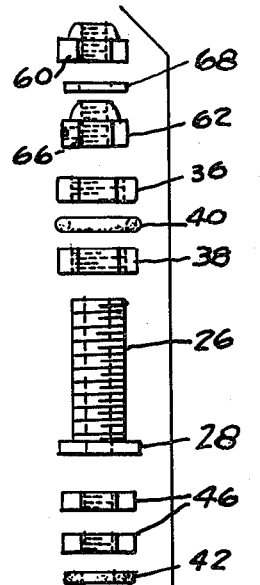
FIG. 2
FIG. 3
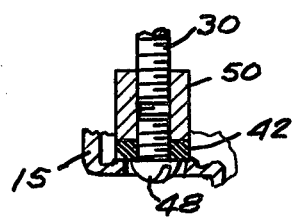
FIG. 4

FAUCET REPLACEMENT VALVE STEM ASSEMBLY

This invention relates to faucets, and, more particularly, to a replacement valve stem assembly for faucets.

Many faucets now in use are constructed so that the valve stem is in threaded engagement with either the faucet body or a threaded member retained within the faucet body. Over a period of extended use the threads on the valve stem and/or the threads on the faucet body or member into which the valve stem is threaded wear to such an extent as to require replacement. In view of the many styles of faucets produced by numerous manufacturers it is sometimes difficult to obtain the proper replacement parts required. More important, however, is the fact that if the threads on the faucet body itself become worn then the whole faucet assembly must be replaced, which in most cases would be relatively costly.

Accordingly, it is an object of this invention to provide a valve stem assembly designed so that it can replace valve stem assemblies of most faucets which are now in use.

A further object of the invention resides in the provision of a replacement valve stem assembly designed for operative connection with an existing faucet body without utilizing the threads on the faucet body or on a member in the faucet body into which the original valve stem was threaded.

A still further object of the invention is to provide a replacement valve stem assembly for a faucet designed to be secured in its entirety on the existing cap of a conventional faucet body.

Other objects, features and advantages of the present invention will become apparent from the following description and accompanying drawing, in which:

FIG. 1 is a fragmentary side elevational view, partly in section, of a faucet showing one form of replacement valve stem assembly according to the present invention;

FIG. 2 is an exploded view of the stem assembly shown in FIG. 1;

FIG. 3 is a view partly in section showing a modified nut construction usable with the stem assembly of the present invention; and FIG. 4 is a fragmentary sectional view showing a modified construction for securing a washer to the valve stem.

In FIG. 1 a conventional faucet body 10 is illustrated having an inlet section 12 adapted to be connected to a source of water under pressure and an outlet spout 16. A port 13 surrounded by a valve seat 14 is formed in a partition 15 which separates the inlet section 12 from spout 16. The valve body 10 is open at its upper end and adapted to be closed by a cap 18 threaded over the open end to the faucet body as at 20. The particular faucet body illustrated has threads 22 within the opening covered by cap 18, these threads being provided for engagement with the valve stem assembly originally provided with the faucet. The replacement valve stem assembly is generally designated 24 and includes a sleeve 26 which is threaded both internally and externally and provided with an enlarged flange 28 at one end thereof. The replacement valve stem assembly of the present invention also includes a stem 30 which is externally threaded to engage with the internal threads of sleeve 26. It will be observed that stem 30 has a length substantially greater than sleeve 26.

The valve stem assembly 24 of this invention is adapted to be operatively associated with the faucet by securing it to the faucet cap 18. Cap 18 has a bore 32 therein through which the conventional original stem of the faucet extends. In the conventional cap the bore 32 is enlarged as at 34 on the underside of the cap to receive a packing material for sealing the original valve stem to the cap. Sleeve 26 of the instant valve stem assembly has an outer diameter sufficiently small to pass upwardly through bore 32. Sleeve 26 is adapted to be fixedly mounted on cap 18 by two nuts 36, 38. Nut 36 engages the top side of cap 18 and nut 38 compresses a suitable seal, such as an O-ring 40, upwardly into the enlarged portion 34 of bore 32 to thus effectively seal sleeve 26 with respect to the bore 32. Sleeve 26 is substantially longer than the axial extent of bore 32 in cap 18 and can be fixedly mounted on cap 18 by nuts 36, 38 in a vertically adjusted position relative to the valve seat 14. This enables sleeve 26 to be used with various types of faucet bodies. In use the inner nut 38 is adjusted along sleeve 26 so that when the sleeve is inserted upwardly through bore 32 in cap 18 it is located axially in the desired position. Thereafter, nut 36 can be tightened to fixedly locate and secure the sleeve on the cap. When the nut 36 is tightened the sleeve itself can be prevented from rotating by gripping flange 28 with a tool, such as pliers.

A washer 42 is secured to the lower end of stem 30 so that when the stem is turned within sleeve 26 in one direction the washer will engage seat 14 and stop the flow through the faucet. In the arrangement shown in FIG. 1 washer 42 is clamped between a nut 44 in the form of a circular threaded bushing and a pair of jam nuts 46. In the arrangement illustrated in FIG. 4 washer 42 is retained on a screw 48 threaded into a cylindrical bushing 50 which is in turn threaded on the lower end of stem 30. If desired, nuts 38 and 44 can both be formed as cylindrical bushings the outer peripheries of which are axially serrated as indicated at 52 in FIG. 3. These nuts may be formed as cylindrical bushings when it is essential that their outer transverse dimension be smaller than a conventional nut of the same size. In the case of nut 44 this may be necessary to enable the nut to fit through the port 13. In the case of nut 38 this may be necessary in order to seat the nut within the enlarged portion 34 of bore 32.

The conventional faucet handle is designated 54 and is formed with a central opening 56 which is enlarged as at 58 on its underside to accommodate the conventional valve stem which is normally vertically serrated at its upper end. In the instant valve stem assembly handle 54 is secured to stem 30 by a pair of nuts 60, 62. Both of these nuts, or at least preferably nut 62, are shaped as an acorn nut (its upper end is generally semi-spherically shaped). When nut 62 has this design it forms an admirable seat for the enlarged portion 58 of the opening 56 in the handle 54. Adjacent its upper end stem 30 is provided with a flat 64 on one side thereof which is adapted to be engaged by a set screw 66 in nut 62 to positively retain the nut in the desired vertically adjusted position on stem 30. This enables handle 54 to be securely affixed to stem 30 by tightening upper nut 60 downwardly on a washer 68 which engages the top face of handle 54. It will be understood, of course, that, if stem 30 is excessively long in relation hto the particular faucet body on which it is being used, after the handle 54 is clamped to the stem at the desired location adjacent the nut 36, the excess portion 70 at the upper end of the stem can be cut off.

As a practical matter it is preferred that sleeve 26 and nuts 36, 38, 44, 46 be formed of brass or the like so as to resist corrosion. On the other hand, since stem 30 is of necessity of rather small diameter, it is preferred to form stem 30 from stainless steel so that it will resist corrosion, and, at the same time, possesses the necessary strength to resist the forces to which the stem is subjected in the opening and closing of the faucet.

I claim:

1. A replacement valve stem assembly for a faucet of the type having a vlave seat positioned in alignment with an apertured cap threaded on the faucet body and through which the valve stem of the faucet normally extends comprising, a sleeve which is threaded both internally and externally and having an outer diameter such as to enable the sleeve to extend through the valve stem aperture in said cap, means engaged with the external threads of said sleeve for fixedly attaching the sleeve to said cap so that the sleeve extends through the cap aperture, an externally threaded valve stem engaged with the internal threads of said sleeve and having a length substantially greater than said sleeve so that when the sleeve is secured to said cap and the cap is threaded on the faucet body the inner end of said stem terminates beyond the inner end of said sleeve adjacent the valve seat in the faucet body and the outer end of said stem extends outwardly beyond said cap and the outer end of said sleeve, means threaded on the inner end of said stem for securing thereon a valve washer adapted to seal said valve seat when the stem is rotated in one direction within said sleeve and nut members threaded on the outer end of said stem for securing a faucet handle thereto.

2. A replacement valve stem assembly as called for in claim 1 wherein said means engaging the external threads of said sleeve comprise a pair of nuts which, when tightened, are adapted to clamp the cap therebetween.

3. A replacement valve stem assembly as called for in claim 2 including an elastic seal on said sleeve and adapted to be positioned between the underside of said cap and one of said nuts for effectively sealing the sleeve on said cap.

4. A replacement valve stem assembly as called for in claim 3 wherein said sleeve is formed with an enlarged flange at the inner end thereof adapted to be gripped by a tool to prevent rotation thereof when the cap is clamped on the sleeve between said nuts.

5. A replacement valve stem assembly as called for in claim 1 wherein said sleeve is formed with an enlarged flange at the inner end thereof adapted to be gripped by a tool to prevent rotation thereof when the sleeve is fixedly attached to said cap by the means engaging the external threads of the sleeve.

6. A faucet having a body provided with an inlet and an outlet and an intermediate apertured valve seat therebetween, said body having an open cylindrical extension aligned axially with the opening of said valve seat, a cap on said body threaded over said cylindrical extension and having an opening therethrough aligned axially with said valve seat and a valve stem assembly mounted on said cap comprising a sleeve which is externally and internally threaded, said sleeve extending through the aperture in said cap, a pair of nuts engaging the external threads on said sleeve and clamping the sleeve to the cap, an externally threaded stem engaging the internal threads of said sleeve, means engaging the threads adjacent the lower end of said stem and securing a washer thereon which, when the stem is turned in one direction, is adapted to engage said seat, a handle inserted over the upper end of said stem and nut means above and below said handle engaging the threads on said stem and securing the handle thereon.

7. A faucet as called for in claim 6 wherein said sleeve is provided with an enlarged flange at the inner end thereof by means of which the sleeve can be gripped to prevent rotation thereof when the sleeve is clamped between said nuts which engage the external threads on the sleeve.

8. A faucet as called for in claim 6 including an elastic sealing member surounding said sleeve and engaging said cap, said sealing member being compressed into sealing engagement with the cap when the cap clamping nuts on the sleeve are tightened.

9. A faucet as called for in claim 6 wherein the nut on said stem between said handle and said sleeve is provided with a set screw for engaging the threads on the stem so as to lock said last-mentioned nut axially in the desired position on said stem.

10. A faucet as called for in claim 6 wherein the means for securing said washer on said stem comprises an internally threaded bushing engaging the threads at the inner end of the stem and extending therebeyond and including a screw threaded into the extending end of the bushing and clamping said washer thereagainst.

11. A faucet as called for in claim 6 wherein said handle is provided with a through bore which is enlarged at the underside of the handle and the nut at the underside of the handle is formed with a generally semispherically shaped end portion seated within the enlarged bore portion of the handle.

* * * * *